(12) United States Patent
Shim et al.

(10) Patent No.: US 7,890,995 B2
(45) Date of Patent: Feb. 15, 2011

(54) SYSTEM AND METHOD FOR REMOTE MANAGEMENT OF COMMUNICATIONS NETWORKS

(75) Inventors: Choon B. Shim, Columbia, MD (US); Richard M. Tworek, Monrovia, MD (US)

(73) Assignee: Cisco Technology, Inc., San Jose, CA (US)

( * ) Notice: Subject to any disclaimer, the term of this patent is extended or adjusted under 35 U.S.C. 154(b) by 1147 days.

(21) Appl. No.: 10/721,753

(22) Filed: Nov. 26, 2003

(65) Prior Publication Data

US 2005/0114665 A1    May 26, 2005

(51) Int. Cl.
*H04L 9/32* (2006.01)
*H04L 29/00* (2006.01)
*H04L 9/08* (2006.01)
*G06F 9/00* (2006.01)
*G06F 21/02* (2006.01)

(52) U.S. Cl. .......... 726/11; 380/259; 380/277; 713/171; 726/17; 726/21; 726/26

(58) Field of Classification Search ......... 713/150–154, 713/170, 171, 162, 168; 726/11, 2–4, 12, 726/16, 17, 21, 26, 27; 380/59, 255, 259, 380/277–279, 282, 283, 285
See application file for complete search history.

(56) References Cited

U.S. PATENT DOCUMENTS

| | | | | |
|---|---|---|---|---|
| 6,104,716 A * | 8/2000 | Crichton et al. | ............. | 370/401 |
| 6,182,086 B1 * | 1/2001 | Lomet et al. | ................. | 707/202 |
| 6,292,801 B1 * | 9/2001 | Campbell et al. | ............. | 707/10 |
| 6,341,311 B1 * | 1/2002 | Smith et al. | ................. | 709/226 |
| 6,349,336 B1 * | 2/2002 | Sit et al. | ..................... | 709/227 |
| 6,360,273 B1 * | 3/2002 | Beurket et al. | ............. | 709/244 |
| 6,374,298 B2 * | 4/2002 | Tanno | ........................ | 709/227 |
| 6,510,464 B1 * | 1/2003 | Grantges et al. | ............ | 709/225 |
| 6,553,422 B1 * | 4/2003 | Nelson | ........................ | 709/227 |
| 6,651,174 B1 * | 11/2003 | Nagaoka et al. | ............... | 726/11 |
| 6,751,738 B2 * | 6/2004 | Wesinger et al. | ............. | 726/14 |
| 6,754,831 B2 * | 6/2004 | Brownell | ...................... | 726/15 |
| 6,968,571 B2 * | 11/2005 | Devine et al. | ................. | 726/11 |
| 6,996,076 B1 * | 2/2006 | Forbes et al. | ................. | 370/310 |
| 7,075,922 B2 * | 7/2006 | Mussman et al. | ........... | 370/352 |
| 7,099,301 B1 * | 8/2006 | Sheu | .......................... | 370/352 |
| 7,107,609 B2 * | 9/2006 | Cheng et al. | .................. | 726/3 |
| 7,133,511 B2 * | 11/2006 | Buntin et al. | ............... | 379/189 |
| 7,239,629 B1 * | 7/2007 | Olshansky et al. | .......... | 370/353 |
| 7,254,832 B1 * | 8/2007 | Christie, IV | ................. | 726/11 |
| 7,257,837 B2 * | 8/2007 | Xu et al. | ........................ | 726/12 |
| 7,363,381 B2 * | 4/2008 | Mussman et al. | ........... | 709/230 |
| 2002/0038364 A1 * | 3/2002 | Schweitzer | ................. | 709/224 |
| 2002/0159440 A1 * | 10/2002 | Mussman et al. | ........... | 370/352 |

(Continued)

*Primary Examiner*—Nasser Moazzami
*Assistant Examiner*—Fatoumata Traore
(74) *Attorney, Agent, or Firm*—Schwegman, Lundberg & Woessner, P.A.

(57) ABSTRACT

The invention provides a system and method for that facilitating the remote management of one or more networks. In enabling the remote management of a network, embodiments of the invention provide limited access to service providers through a firewall, without the need to modify the configuration of the firewall. Advantageously, the cost of providing such access may be reduced compared to conventional approaches. In addition, such access may be limited to data inquiries or other commands, which can reduce the risk that the security of the network is compromised.

13 Claims, 6 Drawing Sheets

U.S. PATENT DOCUMENTS

| | | | |
|---|---|---|---|
| 2003/0009464 A1* | 1/2003 | Campbell et al. | 707/10 |
| 2004/0001479 A1* | 1/2004 | Pounds et al. | 370/352 |
| 2004/0139209 A1* | 7/2004 | Mussman et al. | 709/230 |
| 2004/0161086 A1* | 8/2004 | Buntin et al. | 379/189 |
| 2004/0260747 A1* | 12/2004 | Ying et al. | 709/200 |
| 2005/0008006 A1* | 1/2005 | Schimper | 370/352 |
| 2006/0031936 A1* | 2/2006 | Nelson et al. | 726/23 |

* cited by examiner

SYSTEM AND METHOD FOR REMOTE MANAGEMENT OF COMMUNICATIONS NETWORKS

FIELD OF INVENTION

The invention relates generally to the field of telecommunications. More specifically, but not by way of limitation, the invention relates to a system and method for remotely managing one or more communications networks.

BACKGROUND

Systems and methods are generally known for managing networks with the application of administrative consoles. One problem is how to enable network management by external service providers. A known solutions for management by an external service provider is to grant general administrative privileges to the service provider on a Local Area Network (LAN) or other network to be managed. Another known solution is to configure a firewall to permit access to the network from remote management consoles.

These known systems and methods for management by external service providers have several disadvantages. For example, direct connection to a LAN may not be feasible for a remote service provider. In addition, systems and method for modifying the configuration of a firewall may be costly to implement. Furthermore, approaches that result in broad administrative privileges to external service providers may present a security risk to stakeholders of data in the managed network.

What is needed is a system and method that facilitates remote management of one or more networks, while mitigating the risk associated with providing access through network firewalls.

SUMMARY OF THE INVENTION

The invention provides a system and method for that facilitating the remote management of one or more networks. In enabling the remote management of a network, embodiments of the invention provide limited access to service providers through a firewall, without the need to modify the configuration of the firewall. Advantageously, the cost of providing such access may be reduced compared to conventional approaches. In addition, such access may be limited to data inquiries or other commands, which can reduce the risk that the security of the network is compromised.

Embodiments of the invention provide a functional architecture having a control unit inside the firewall, and a proxy server outside the firewall. In one respect, embodiments of the invention provide a method to configure the control unit. In another respect, embodiments of the invention provide a method to configure the server. In yet another respect, embodiments of the invention provide a system and method for communicating between the control unit and the proxy server.

The features and advantages of the invention will become apparent from the following drawings and detailed description.

BRIEF DESCRIPTION OF THE DRAWINGS

Embodiments of the invention are described with reference to the following drawings, wherein.

DETAILED DESCRIPTION

Sub-headings are used below for organizational convenience. The disclosure of any particular feature is not necessarily limited to any particular section, however. The detailed description begins with an overview of a system architecture.

System Architecture

Figure 1:
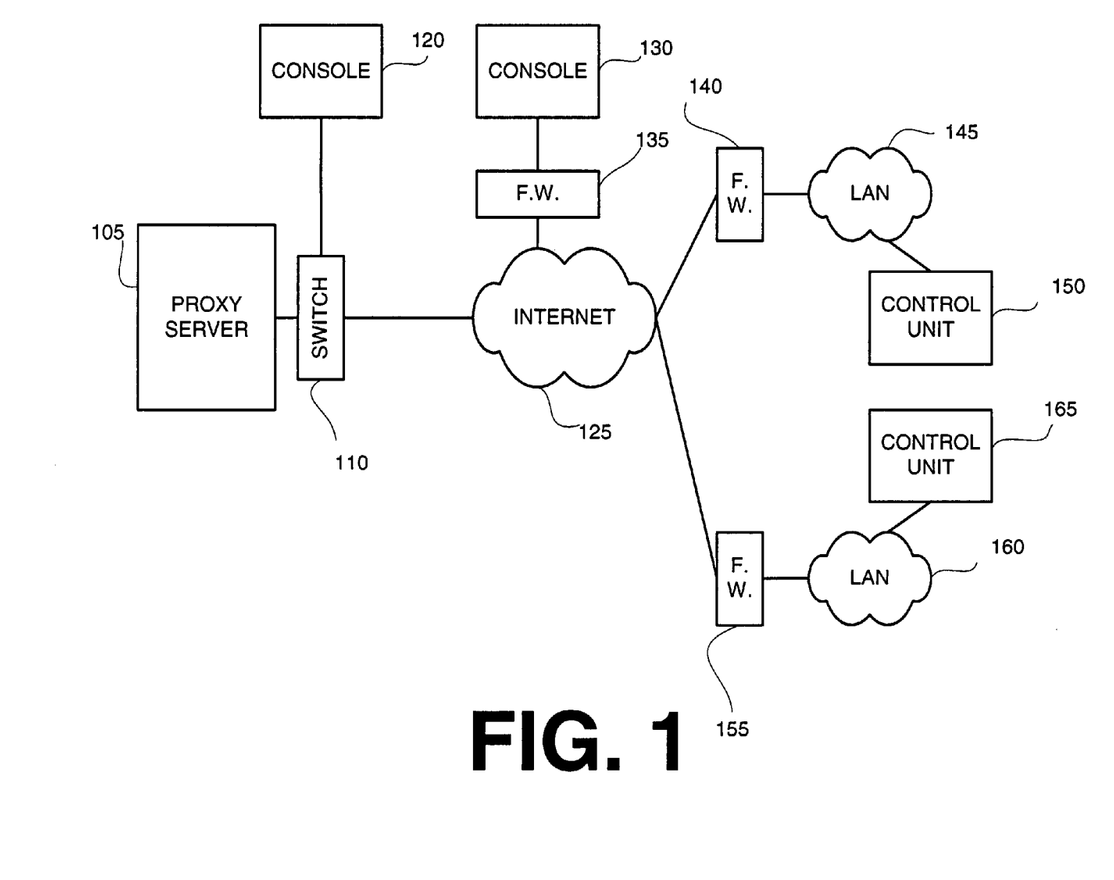
FIG. 1 is a block diagram of a functional architecture for a communications system, according to an embodiment of the invention.

FIG. 1 is a block diagram of a functional architecture for a communications system, according to an embodiment of the invention. As shown therein, a proxy server 105 is coupled to console 120 and Internet 125 via a switch 110. Internet 125 is further coupled to firewall 135, which is coupled to console 130. In addition, Internet 125 is coupled to firewall 140, which is coupled to control unit 150 via LAN 145. Likewise, Internet 125 is also coupled to firewall 155, which is coupled to control unit 165 via LAN 160. Control units 150 and 165 may also be coupled to other networks (not shown) or devices (not shown).

As used herein, Internet 125 represents a public network. Internet 125 can be replaced with a Wide Area Network (WAN), Local Area Network (LAN), or other publicly-accessible wired or wireless network, according to design choice.

As used herein, LAN 145 and LAN 160 represent enterprise networks that are inside (i.e., on the protected side) of firewalls 140 and 155, respectively. LANs 145 and 160 could be or include WANs or other network configurations, according to application requirements.

Consoles 120 and 130 each may be or include a personal computer, a desktop computer, a laptop computer, a Personal Digital Assistant (PDA), or other terminal or device suitable for handling necessary user interface functions. Moreover, consoles 120 and 130 each may include client software to facilitate operation in a networked environment.

The control units 150 and 165 may each include a central processing unit (CPU) (not shown), such as an Intel x86, Intel x86 compatible device, Intel Pentium™, or other processor. The control units 150 and 165 may each further include a hard disk or other storage device (not shown) for storing programs and/or data. In addition, control units 150 and 165 may each have Random Access Memory (RAM), or other temporary memory (not shown) to execute Linux or other resident OS, and to execute application programs. Control units 150 and 165 may include application code (not shown) for managing LANs 145 and 160, respectively or for managing other networks (not shown) and/or devices (not shown). In addition, the control units 150 and 165 may each be or include a network server. In the illustrated embodiment, Control Units 150 and 165 are inside (i.e., on the protected side) of firewalls 140 and 155, respectively.

Proxy server 105 is a network-based server, and may include an Operating System (OS) (not shown), application code (not shown), and/or a database (not shown). In one respect, proxy server 105 provides access between each of consoles 120 and 130 and each of the control units 150 and 165. Control unit 150 may contain management data related to LAN 145 or other network (not shown) or network device (not shown), and control unit 165 may contain management data related to LAN 160 or other network (not shown) or network device (not shown). Proxy server 105 may aggregate and store performance data provided by control units 150 and 165, respectively. In operation, a user at either console 120 or 130 may provide commands to either or both of control units 150 and 165 via the proxy server 105.

In the illustrated embodiment, proxy server 105 is coupled to a public network. In an alternative embodiment, proxy server 105 may be protected inside a firewall (not shown). In yet another embodiment, proxy server 105 may be implemented within a De-Militarized Zone (DMZ) between a protected network (not shown) and the unprotected Internet 125 or other public network.

The quantity of any component illustrated in FIG. 1 may vary, according to application requirements.

Process Flows

Figure 2:
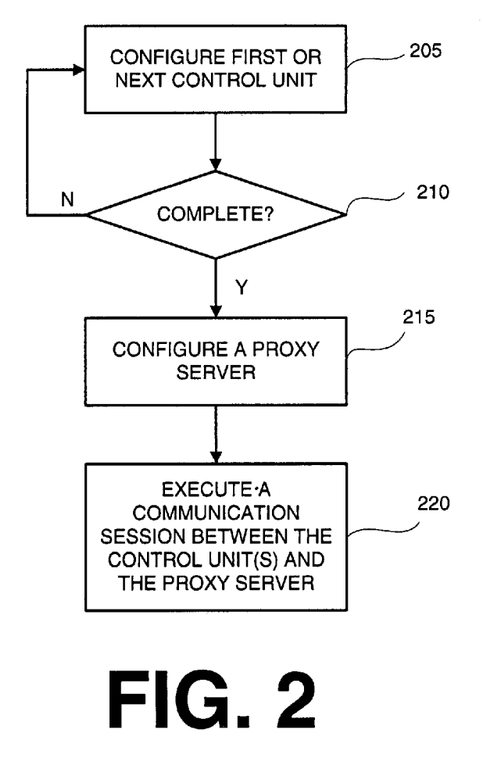
FIG. 2 is a flow diagram of a process for remotely managing a network, according to an embodiment of the invention.
Figure 3:
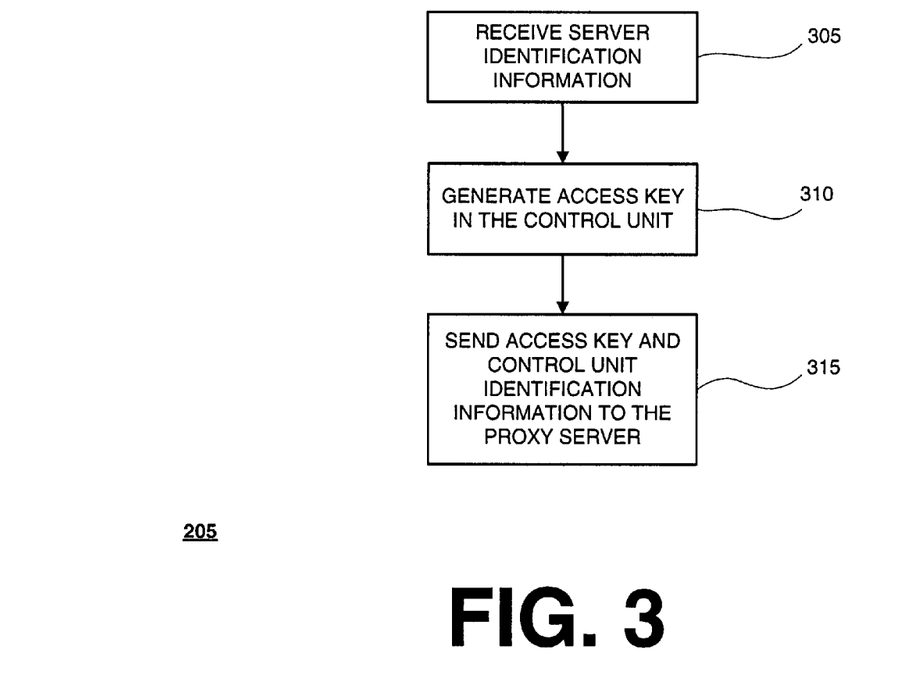
FIG. 3 is a flow diagram of a process for configuring a control unit, according to an embodiment of the invention.
Figure 4:
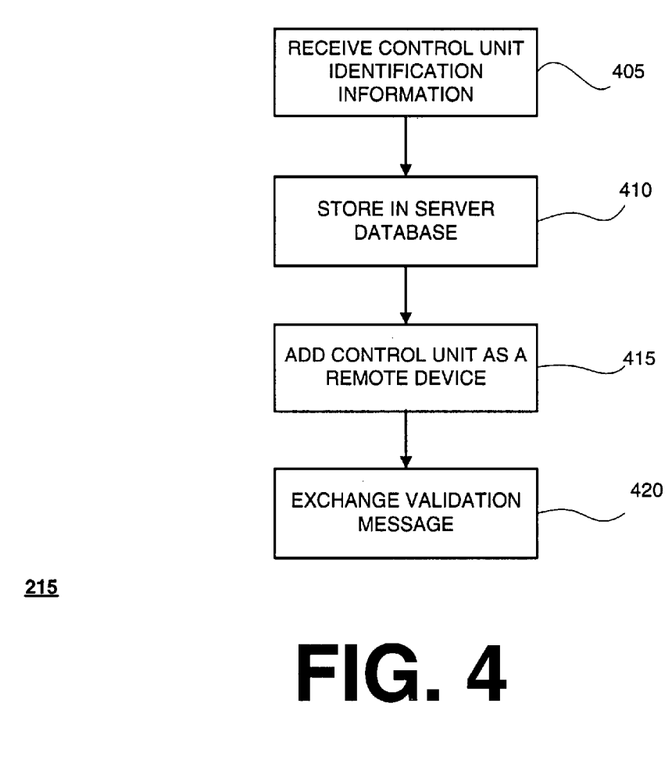
FIG. 4 is a flow diagram of a process for configuring a proxy server, according to an embodiment of the invention.

FIGS. 2-4 illustrate enabling processes that can be performed using the functional architecture described above.

FIG. 2 is a flow diagram of a process for remotely managing a network, according to an embodiment of the invention. As shown therein, an overall process begins in step 205 by configuring a first or next control unit. Step 205 is described in more detail below, with reference to FIG. 3. Then, in conditional step 210, it is determined whether all control units have been configured. Where the result of conditional step 210 is in the negative, the process returns to step 205. If however, the result of conditional step 210 is in the affirmative, the process advances to step 215 to configure a proxy server. Step 215 is described in more detail below, with reference to FIG. 4. Finally, after both the control unit(s) and the proxy server have been configured, the process advances to step 220 to execute a communication session between the control unit(s) and the proxy server. Step 220 is described in more detail below, with reference to FIGS. 5 and 6.

In an alternative embodiment of the process illustrated in FIG. 2, conditional step 210 is omitted. Thus, a communication session can be executed in step 220 after a single control unit is configured in step 205 and after the proxy server is configured in step 215.

FIG. 3 is a flow diagram of a process for configuring a control unit, according to an embodiment of the invention. The diagram is from the perspective of a control unit. As shown therein, the process begins in step 305 by receiving proxy server identification information. Such proxy server identification information may include, for example, server host name, IP address and logical port number.

Where a user, at console 120 or 130, for example, does not provide the server IP address, control unit 150 or 165 may obtain the server IP address using an inquiry command directed to the proxy server 105.

Next, the process advances to step 310 where the control unit 150 or 165 generates an access key. Finally, in step 315, the control unit 150 or 165 sends the access key and control unit identification information to the proxy server 105. Control unit identification information may include, for example, one or more of an external IP address and an internal IP address.

Accordingly, one or both of control units 150 and 165 are configured for remote communications with proxy server 105.

FIG. 4 is a flow diagram of a process for configuring a proxy server, according to an embodiment of the invention. The diagram is from the perspective of the proxy server 105. As; shown therein, the process begins in step 405 by receiving control unit identification information from each of control units 150 and 165. Next, in step 410, the proxy server 105 stores the control unit information in a server database. Then, in step 415, the proxy server 105 adds each of control units 150 and 165 as remote devices. Finally, in step 420, a validation message may be exchanged between the proxy server 105 and each of the control units 150 and 165 to confirm the configuration of the control units and the server.

Communicating Through a Firewall

Figure 5:
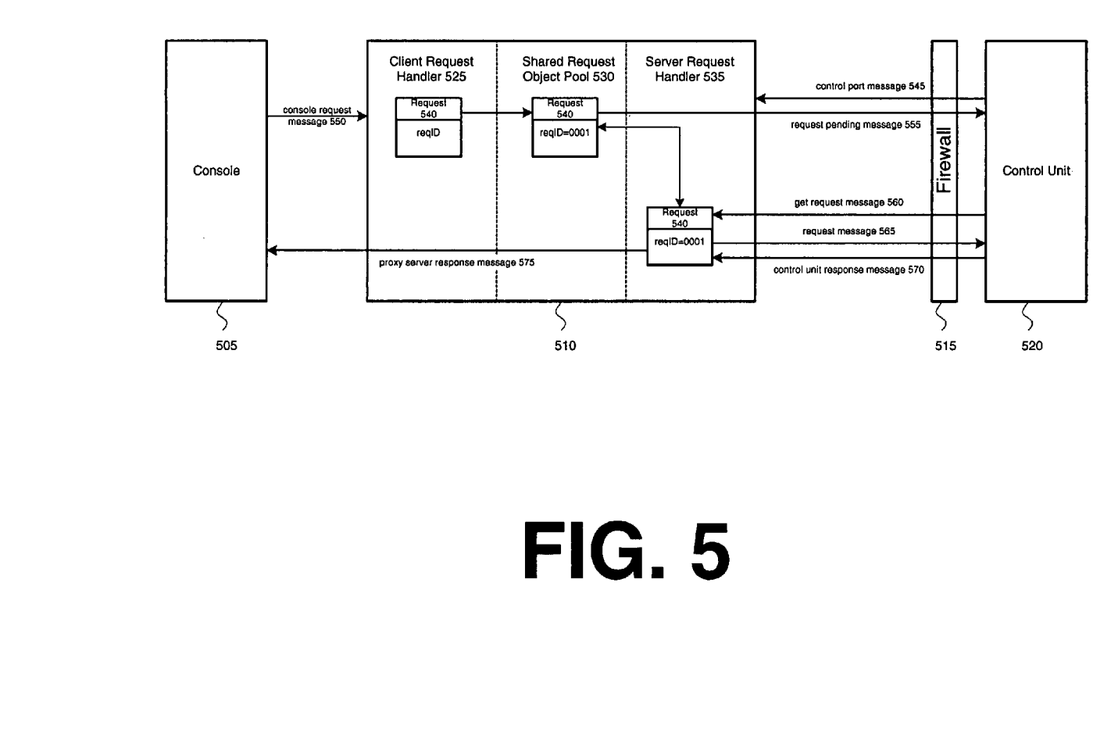
FIG. 5 is a block diagram of a detailed functional architecture for a communications system according to an embodiment of the invention.

FIG. 5 is a block diagram of a detailed functional architecture for a communications system, according to an embodiment of the invention. As shown therein, a console 505 is coupled to a proxy server 510. The Proxy server 510 is coupled to a control unit 520 through a firewall 515. Proxy server 510 includes client request handler 525, shared request object pool 530 and server request handler 535. A request object 540 may be instantiated in any one or more of handler 525, pool 530, and handler 535.

In other embodiments, multiple consoles may be coupled to the proxy server 510. For example, consoles 120 and 130 could be substituted for console 505. In addition, in other embodiments, the proxy server 510 may be coupled to multiple control units through corresponding multiple firewalls. For instance, control units 150 and 165 could be substituted for control unit 520, and firewalls 140 and 155 could be substituted for firewall 515. Moreover, a proxy server 510 may have the features described above with reference to proxy server 105.

The operation of the functional components illustrated in FIG. 5, including messages 545, 550, 560, 565, 570 and 575 is described with reference to FIG. 6 below.

Figure 6:
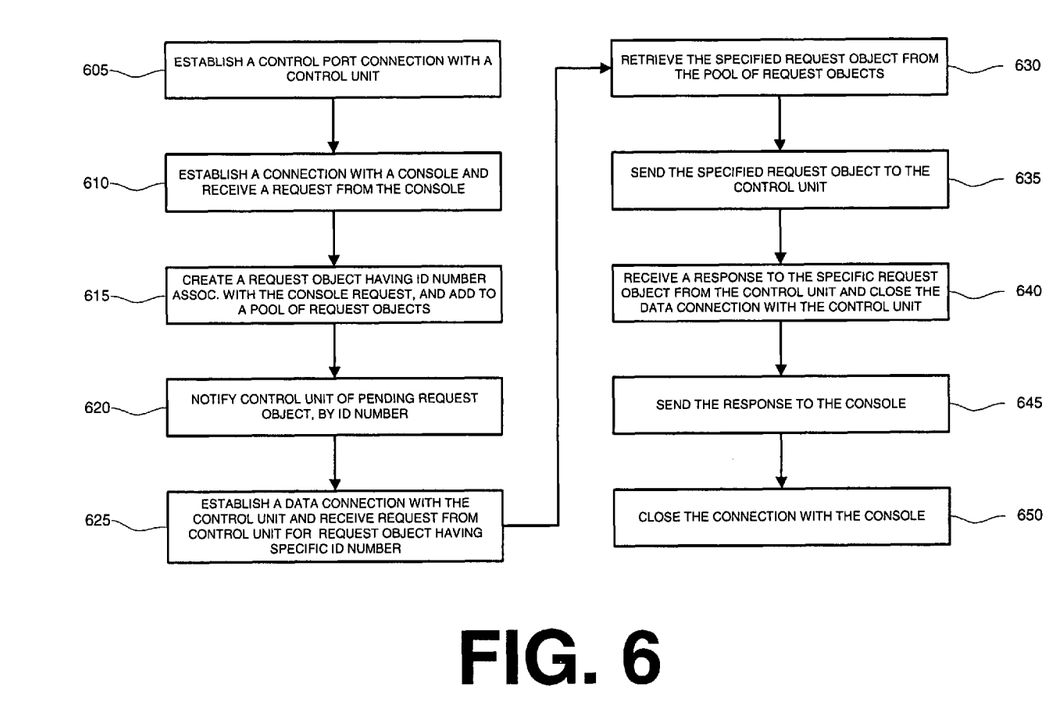
FIG. 6 is a flow diagram of a process for performing a communication session through a firewall, according to an embodiment of the invention.

FIG. 6 is a flow diagram of a process for performing a communication session through a firewall, according to an embodiment of the invention.. FIG. 6 is illustrated from the perspective of a proxy server. As shown therein, the process beings in step 605 by establishing a control port connection with a control unit. For example, proxy server 510 may establish a control port connection by receiving control port message 515 from the control unit 520 via firewall 515. The port connection may be used, for example, to open and close data connections, and/or to provide security functions.

Next, in step 610, the proxy server 510 establishes a connection with a console, and receives a request from the console. For instance, after establishing a server/client link with the console, which may be or include a Secure Socket Layer (SSL) link, proxy server 510 may receive console request message 550 from console 505.

Console request message 550 may be a request for network management data from control unit 520 related to LAN 145, LAN 160, other networks (not shown) coupled to control unit 150 and/or 165, or network devices (not shown) coupled to control units 150 and/or 165. For instance, console request message 550 may be a request for IP-PBX status information, where an IP-PBX is coupled to control unit 150 and/or 165. Console request message 550 may be a request for status information related to an Uninterruptible Power Supply (UPS) or other network device coupled to control unit 150 and/or 165. Further, console request message 550 may be a back-up, shut-down, re-start, or other control command directed to the control unit 150 and/or 165, or to an IP-PBX coupled to one of control unit 150 and/or 165, for example.

Then, in step 615, the proxy server 510 creates a request object having an identification (ID) number, where the request object is related to the console request. In addition, in step 615, the proxy server 510 adds the request object to a pool of one or more request objects. With reference to FIG. 5, step 615 may include creating request object 540 in client request handler 525. Step 615 may also include the assignment of ID number 0001 to request object 540, and the addition of request object 540 to object pool 530.

The process is then promoted to step 620, where the proxy server 510 notifies the control unit of a pending request object, by ID number. For example, proxy server 510 could send request pending message 555 to control unit 520 with notice of pending request object 540 having ID number 0001.

Next, in step 625, the proxy driver creates a data connection with the control unit, and receives a request from the control unit for a request object having a specific ID number. The data connection may be, for example, a TCP/IP socket, opened according to commands issued via the control port connection. As an illustration of the data flow over the data connection, proxy driver 510 could receive a get request message 560 from the control unit 520. For instance, the get request message could specifically request the request object 540 having ID number 0001.

Then, in step 630, the proxy driver retrieves the specified request object from the pool of one or more request objects. For example, with reference to FIG. 5, the server request handler 535 could retrieve request 540 having specified ID number 0001 from the shared request object pool 530.

The process then advances to step 635, where the proxy driver sends the specified request object to the control unit. Thus, in FIG. 5, the request handler 535 sends request 540 having the specified ID number 0001 to the control unit 520 as part of request message 565.

In step 640, the proxy server 510 receives a response to the specific request object from the control unit and closes the data connection with the control unit. For instance, in this step, the request handler 535 receives management data from the control unit 520 as part of control unit response message 570.

In step 645, the proxy server 510 sends the response to the console. As an example, request handler 535 could send the management data to the console 505 as part of proxy server response message 575. In this case, proxy server response message 575 contains management data from control unit 520 that satisfies console request message 550 from the console 505.

Finally, the proxy server 510 closes the connection with the console in step 650, for example by ending the SSL link between the console 505 and the proxy server 510.

The description above illustrates how the process in FIG. 6 can be executed by the functional architecture in FIG. 5. In addition, the process described with reference to FIG. 6 can be adapted to architectures having multiple consoles and/or multiple control units. To the extent that proxy server 510 includes at least one processor, the process illustrated in FIG. 6 may be embodied in processor-executable code, the processor-executable code being executed by the at least one processor.

CONCLUSION

The invention described above thus overcomes the disadvantages of known systems and methods by facilitating the remote management of one or more networks without requiring modification to a firewall protecting the network to be managed, and without granting broad administrative privileges to external service providers. While this invention has been described in various explanatory embodiments, other embodiments and variations can be effected by a person of ordinary skill in the art without departing from the scope of the invention.

The invention claimed is:

1. A method for controlling a network remotely, the method comprising:
    configuring a first control unit, inside a first firewall, the first control unit separate from the first firewall and used to control the network, configuring of the first control unit including:
        querying a proxy server outside the first firewall from the first control unit to obtain a proxy server IP address,
        receiving proxy server identification information with respect to the proxy server outside the first firewall, the proxy server identification information including the proxy server IP address,
        generating an access key in the first control unit, and
        sending the access key and first control unit identification information to the proxy server;
    configuring the proxy server outside the first firewall, the proxy server being implemented within a De-Militarized Zone (DMZ) between the network and an unprotected public network, configuring of the proxy server including:
        receiving the first control unit identification information,
        storing the first control unit identification information in the proxy server,
        adding the first control unit as a first remote device, and
        exchanging a validation message between the first control unit and the proxy server,
    establishing a session between the first control unit and the proxy server, by use of the access key; and
    establishing a connection between the proxy server and a console which resides within the unprotected public network, to permit remote user management of the network by communication between the first control unit and the console via the proxy server.

2. The method of claim 1, further comprising configuring a second control unit inside a second firewall, the proxy server being outside the second firewall.

3. The method of claim 1, wherein receiving the proxy server identification information includes receiving a proxy server host name, a proxy server IP address, and a proxy server port number.

4. The method of claim 1, wherein establishing a session between the first control unit and the proxy server includes coupling through a second firewall, the proxy server being inside the second firewall.

5. The method of claim 4, further comprising connecting between the proxy server and a console, the console being inside the second firewall, the connecting using an IP address facing inside the second firewall.

6. A communications system, comprising:
    a first enterprise network;
    a first firewall;
    a first control unit communicatively coupled to the first enterprise network to manage the first enterprise network, the first control unit being separate from the first firewall:
    a public network; and
    a proxy server located outside the first fire wall and implemented within a De-Militarized Zone (DMZ) between the first enterprise network and the public network, the first control unit being configured to:
        querying the proxy server to obtain a proxy server IP address;

receive proxy server identification information with respect to the proxy server, the proxy server identification information including the proxy server IP address;

generate an access key; and send the access key and first control unit identification information to the proxy server, the proxy server being configured to:

receive the first control unit identification information;

store the first control unit identification information;

add the first control unit as a first remote device; and exchange a validation message between the first control unit and the proxy server, the first control unit and the proxy server configured to establish a communication session based on the first access key, the proxy server to aggregate and store performance data provided by the first control unit.

7. The communications system of claim 6, wherein receiving the proxy server information includes a proxy server host name and a proxy server port number.

8. The communication system of claim 6, further comprising:

a second firewall communicatively coupled to the public network;

a second control unit communicatively coupled to the second firewall; and a second enterprise network communicatively coupled to the second control unit, the second control unit being configured with proxy server information, the proxy server being configured with second control unit information, the second control unit being further configured to send a second access key to the proxy server, the second control unit and the proxy server configured to establish a communication session based on the second access key.

9. A communications system, comprising:

a first console residing within an unprotected public network and configured to generate at least one console request message, the console request message including at least one of a request for network management data, a request for Internet Protocol (IP)-Private Branch Exchange (PBX), or a request for status information;

a first firewall communicatively coupled to the proxy server;

a first control unit to control a protected network, the first control unit residing within the protected network and being communicatively coupled to the first firewall; and a proxy server communicatively coupled to the first console, the proxy server configured to establish a connection with the first control unit by sending proxy server identification information including a proxy server IP address to the first control unit, receive from the first control unit control unit identification information and an access key generated by the first control unit, adding the first control unit as a first remote device, and exchange a validation message with the first control unit, the proxy server further being configured to pool the at least one console request message, to provide access from the first console to the first control unit and to aggregate and store performance data provided by the first control unit, the proxy server being implemented within a De-Militarized Zone (DMZ) between a protected network and the unprotected public network the first control unit configured to receive the at least one request from the proxy server, and to output at least one response corresponding to the at least one request to the proxy server, the proxy server configured to output the at least one response to the first console.

10. The system of claim 9, further comprising a second console communicatively coupled to the proxy server, the second console configured to generate at least one other request, the proxy server configured to pool the at least one other request.

11. The system of claim 9, further comprising:

a second firewall communicatively coupled to the proxy server; and a second control unit, the second control unit communicatively coupled to the second firewall, the second control unit configured to receive the at least one request from the proxy server, the second control unit further configured to output at least one response corresponding to the at least one request to the proxy server, the proxy server configured to output the at least one response to the first console.

12. The system of claim 9, wherein the proxy server includes:

a client request handler for receiving a client request from the first console;

a shared request object pool communicatively coupled to the client request handler, the shared request object pool configured to store the at least one request; and a server request handler communicatively coupled to the shared request object pool, the server request handler configured to read the at least one request from the shared request object pool, the server request handler configured to send the at least one request to the first control unit, the server request handler configured to receive the at least one response, the server request handler configured to output the at least one response to the first console.

13. The system of claim 9, wherein the proxy server includes processor-executable code, the code performing the steps of:

receiving a client request from the first console;

writing the at least one request;

reading the at least one request;

sending the at least one request to the first control unit;

receiving the at least one response; and outputting the at least one response to the first console.

* * * * *

UNITED STATES PATENT AND TRADEMARK OFFICE
CERTIFICATE OF CORRECTION

| | | |
|---|---|---|
| PATENT NO. | : 7,890,995 B2 | |
| APPLICATION NO. | : 10/721753 | |
| DATED | : February 15, 2011 | |
| INVENTOR(S) | : Choon B. Shim et al. | |

It is certified that error appears in the above-identified patent and that said Letters Patent is hereby corrected as shown below:

On the face page, in field (57), under "Abstract", in column 2, line 1, after "for" delete "that".

In column 7, line 54, in Claim 9, after "control unit" delete "control unit".

Signed and Sealed this
Third Day of May, 2011

David J. Kappos
*Director of the United States Patent and Trademark Office*